United States Patent
Tokui

(10) Patent No.: US 9,948,848 B2
(45) Date of Patent: Apr. 17, 2018

(54) IMAGING DEVICE WITH DEPTH OF FIELD ADJUSTMENT

(71) Applicant: Sharp Kabushiki Kaisha, Osaka-shi, Osaka (JP)

(72) Inventor: Kei Tokui, Osaka (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 14/900,772

(22) PCT Filed: Apr. 21, 2014

(86) PCT No.: PCT/JP2014/061128
§ 371 (c)(1),
(2) Date: Dec. 22, 2015

(87) PCT Pub. No.: WO2015/001835
PCT Pub. Date: Jan. 8, 2015

(65) Prior Publication Data
US 2016/0142618 A1    May 19, 2016

(30) Foreign Application Priority Data
Jul. 5, 2013  (JP) ................. 2013-141446

(51) Int. Cl.
*H04N 5/232* (2006.01)
*G03B 13/36* (2006.01)
*G02B 7/36* (2006.01)

(52) U.S. Cl.
CPC .......... *H04N 5/23212* (2013.01); *G02B 7/36* (2013.01); *G03B 13/36* (2013.01); *H04N 5/23293* (2013.01); *G03B 2217/18* (2013.01)

(58) Field of Classification Search
CPC ... G06T 7/0051; G06T 7/0065; G06T 7/0069; G06T 5/003; G03B 13/30; H04N 5/23212; H04N 5/2356
See application file for complete search history.

(56) References Cited

U.S. PATENT DOCUMENTS

2006/0164535 A1* 7/2006 Oyama ............... H04N 1/0044
                                                    348/333.01
2008/0259176 A1* 10/2008 Tamaru .................. G03B 13/32
                                                    348/222.1
(Continued)

FOREIGN PATENT DOCUMENTS

JP   2003-209727 A   7/2003
JP   2005-39680 A    2/2005
(Continued)

OTHER PUBLICATIONS

Official Communication issued in International Patent Application No. PCT/JP2014/061128, dated Jul. 15, 2014.

*Primary Examiner* — Nelson D. Hernández Hernández
(74) *Attorney, Agent, or Firm* — Keating & Bennett, LLP

(57) ABSTRACT

First image information whose depth of field includes a subject in a focus position set by a control section before photo shooting and second image information captured in a position focus different from that of the first image information are included. The focus position of the second image information is determined on the basis of the focus position of the first image information. The first image information is stored together with an image with an extended depth of field. This makes it possible to provide an imaging device which, when obtaining an extended depth of field from a plurality of images of different focus positions, can reduce failures in photo shooting due to a movement of a subject or camera shake.

9 Claims, 5 Drawing Sheets

(56) References Cited

U.S. PATENT DOCUMENTS

| | | | |
|---|---|---|---|
| 2011/0292248 A1* | 12/2011 | de Leon | H04N 1/00307 348/231.99 |
| 2013/0010137 A1 | 1/2013 | Kawai | |
| 2014/0293117 A1 | 10/2014 | Murakami | |

FOREIGN PATENT DOCUMENTS

| | | |
|---|---|---|
| JP | 2008-271240 A | 11/2008 |
| JP | 2013-21407 A | 1/2013 |
| JP | 2013-117848 A | 6/2013 |

* cited by examiner

IMAGING DEVICE WITH DEPTH OF FIELD ADJUSTMENT

TECHNICAL FIELD

The present invention relates to imaging devices and, in particular, to an imaging device that makes it possible to obtain an extended depth of field from a plurality of shot images.

BACKGROUND ART

As a technique for taking focused clear images, an autofocus technique for focusing on a predetermined position automatically has been known. Examples of known schemes of autofocus technology include a phase-difference scheme, a contrast scheme, and the like. Most of the cameras that are mounted in recent compact digital cameras and smartphones adopt the contrast scheme of autofocus.

The contrast scheme is a scheme for focusing by, while moving a focusing lens, searching for a focus position where an imaging element obtains a high-contrast image. A subject to be focused on is set in the center of an image to be taken, set by detecting the face of the person, or designated by a photographer. At this point in time, the subject thus set is focused on automatically, instead of the photographer's adjusting the focus by him/herself. However, in the presence of a plurality of subjects at different distances, any subject that falls out of the depth of field appears blurred, even when focusing is obtained by autofocus.

To address this problem, there have been proposed techniques for, by selecting in-focus regions from a plurality of images of different focus positions and combining the in-focus regions, generating a wholly-focused image focused on the whole scene photographed. For example, PTL 1 discloses a method for making a wholly-focused composite image even in a scene with camera shake or motion blur by taking a plurality of images of different focus positions, bringing the corresponding points on the images into alignment with each other to morph the images, and taking a weighted average so that great weights are assigned to pixels of high sharpness. Further, such a technique achieves photo shooting that does not require focusing such as autofocusing, as it generates an image focused on the whole scene photographed.

CITATION LIST

Patent Literature

PTL 1: Japanese Unexamined Patent Application Publication No. 2008-271240

SUMMARY OF INVENTION

Technical Problem

However, even such a technique as that disclosed in PTL 1 for making a wholly-focused composite image suffers from photographic failures such as a duplicate image of a subject due to a large movement of an imaging element or a large movement of the subject during photo shooting with varied focus positions.

It is an object of the present invention to provide an imaging device capable of storing shot images comparable to at least those taken by usual photo shooting and of reducing photographic failures.

Solution to Problem

An imaging device of the present invention is an imaging device including: an imaging element that obtains image information with varied focus positions; a control section that controls the focus positions; and an image processing section that performs image processing on the image information, wherein the image processing section includes a depth-of-field adjusting section that performs a process for generating, from plural pieces of image information obtained by the imaging element, an image whose depth of field has been adjusted, the plural pieces of image information include first image information whose depth of field includes a subject in a focus position set by the control section when the plural pieces of image information were obtained and second image information captured in a focus position different from that of the first image information, the focus position of the second image information is set on a basis of the focus position of the first image information, and the first image information is stored together with the image whose depth of field has been adjusted. The image processing section further includes an adjustment judging section that judges a result of an adjustment made by the depth-of-field adjusting section, and the first image information is stored on a basis of a result of a judgment made by the adjustment judging section.

Further, the first image information is stored together with the image whose depth of field has been adjusted. The focus position of the second image information is set so that the depth of field of the first image information and the depth of field of the second image information are adjacent to each other or partially overlap each other.

The number of plural pieces of image information to be obtained in focus positions different from that of the first image information is set on the basis of the focus position of the first image information.

The number of plural pieces of image information to be obtained in focus positions different from that of the first image information is determined on a basis of the focus position of the first image information and a range of depth-of-field adjustments, and the image processing section adjusts the depth of field of the first image information.

The present specification contains matters disclosed in the specification and/or drawings of Japanese Patent Application JP 2013-141446, on which the priority of the present application is based.

Advantageous Effects of Invention

The imaging device of the present invention enables a depth-of-field adjustment appropriate for a set subject. Further, the imaging device has an advantage of, even in the event of a failure in a depth-of-field adjustment process, taking an image focused on a main subject.

DESCRIPTION OF EMBODIMENTS

Embodiments of the present invention are described in detail below with reference to the drawings. It should be noted that representations in each drawing are described in an exaggerated manner to facilitate comprehension and may be different from actualities.

First Embodiment

Figure 1A:
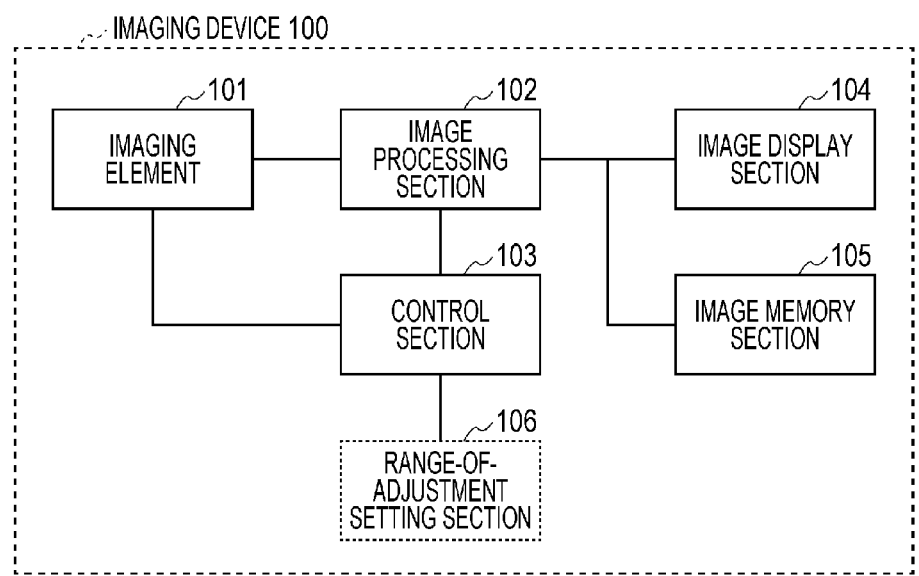
FIG. 1A is a functional block diagram showing an example configuration of an imaging device according to a first embodiment of the present invention.

FIG. 1A is a functional block diagram showing an example configuration of an imaging device according to an embodiment of the present invention. An imaging device 100 according to the present embodiment includes an imaging element 101, an image processing section 102, a control section 103, an image display section 104, and an image memory section 105. A range-of-adjustment setting section 106, which can be optionally provided, will be described in section "Second Embodiment".

The imaging element 101 obtains image information. The imaging element 101 includes a solid-state imaging element, a lens, and the like. Examples of the solid-state imaging element include a CCD (charge-coupled device) and a CMOS (complementary metal oxide semiconductor) sensor. Further, the imaging element 101 includes a component or mechanism for a focus adjustment. Such a component or mechanism is achieved for example by driving a lens with an actuator or driving a liquid lens. Making a focus position adjustment with a liquid lens or a polymer lens is preferred because doing so achieves a reduction in the angle of view between images of different focus positions. The image information thus obtained is transmitted to the image processing section 102.

The image processing section 102 performs image processing on the image information transmitted from the imaging element 101. Examples of the image processing that is performed include appropriate processes such as noise reduction, sharpness, saturation enhancement, contrast enhancement, white balance, and file compression, as well as the after-mentioned process for making a composite image with an extended depth of field.

The control section 103 controls conditions for photo shooting with the imaging element 101, such as the focus and the exposure, in accordance with the image information captured by the imaging element 101. Examples of such control include focus control based on the contrast scheme and the like.

The image processing section 102 and the control section 103 can be achieved by software processing by a CPU (central processing unit) or a GPU (graphics processing unit) or hardware processing by an ASIC (application specific integrated circuit) or an FPGA (field programmable gate array).

The image display section 104 displays the image information subjected to the image processing by the image processing section 102. Examples of the image information that is displayed include a preview image to be shot, a shot image, and the like. The image display section 104 is constituted by a liquid crystal display, an organic EL (electro luminescence) display, or the like.

The image memory section 105 can store the captured image information in a compressed or uncompressed manner, and stores the image information in a storage medium that is inserted in the imaging device 100, such as a flash memory or a hard disk.

Figure 2A:
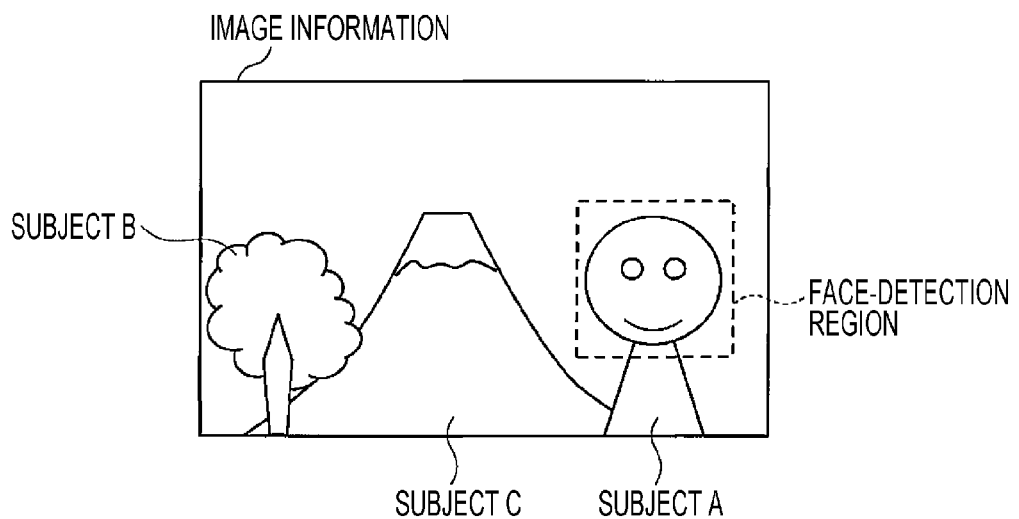
FIG. 2A is a diagram showing a first example of a photographed scene.
Figure 2B:
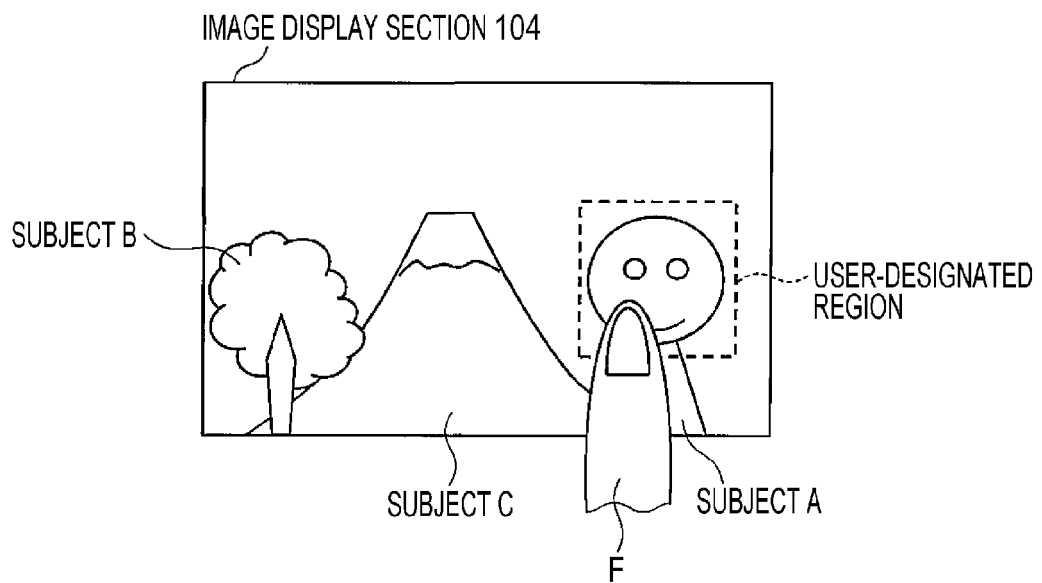
FIG. 2B is a diagram showing a second example of a photographed scene.

FIG. 2A is a diagram showing an example of the image information captured by the imaging element 101. The image information contains a subject A, a subject B, and a subject C in order of increasing distance from the imaging device 100. The control section 103 makes a focus position adjustment in accordance with information obtained from the imaging element 101 and the like. Conventionally, a depth-of-field extension technique has not required focusing. Meanwhile, the present embodiment not only appropriately makes a depth-of-field extension, but also makes a focus position adjustment to reduce photographic failures. It is possible to use focus position adjustment that has conventionally been used. An example is to adjust the focus of the imaging element 101 by calculating a presumably appropriate focus position by calculating the center of the image or the overall contrast of the image. Alternatively, as shown in FIG. 2A, it is possible to detect the position of the face from the image information and make an adjustment so that the face-detection region is in focus. Still another method is, as shown in FIG. 2B, to configure the image display section 104 to have a touch panel function, allow a user to select and designate, with a finger F or the like, the subject that he/she would most like to focus on, and make an adjustment so that the user-designated region selected by the user is in focus. Further, in the case of taking an image focused on the whole scene photographed, the image display section 104 can display, as a preview image, image information whose focus position has been adjusted for the main subject, although it has been impossible to display an image suitable as a preview image, as time is required to combine images into a composite image.

The control section 103 causes the imaging element 101 to take a plurality of images with shifts in focus. Note here that plural pieces of image information are captured so that at least one of them includes, in the depth of field to be photographed, the subject in the focus position set automatically or by the user. Such image information including, in the depth of field to be photographed, the subject in the focus position set automatically or by the user is obtained as first image information.

Furthermore, in order to obtain image information whose focus position is different from the focus position of the first image information, the control section 103 calculates a focus position on the basis of the focus position set automatically or by the user. The calculation of the focus position can be easily achieved by preparing, in accordance with the set focus position, an LUT (look-up table) having a plurality of focus positions set therein. For example, when the set focus position is X0, focus positions X1 and X2 to be photographed are read out with reference to the LUT, and photo shooting is performed with focus on X0, X1, and X2.

Further, since it is desirable that lens driving for focusing be unidirectional, the LUT can be prepared so that when the set focus position is X0, focus positions including such values that focus positions to be read out are set for example to X1, X0, and X2 are read out, and the order in which they are photographed can be easily calculated from the LUT.

Furthermore, appropriate setting of the number of shots according to the set focus position can be easily achieved by preparing the LUT. For example, a small number of pieces of image information representative of a distant-view focus position are captured, as such information image has a great depth of field, and a large number of pieces of image information representative of a near-view focus position are captured, as such information image has a shallow depth of field. When the set focus position is F0, which means a distant view, three focus positions F1, F0, and F2 are read out from the LUT. When the set focus position is N0, which means a near view, four focus positions N1, N0, N2, and N3 are read out from the LUT. Thus, such setting is achieved.

Therefore, by the control section 103 performing such a method for calculating a focus position, an appropriate focus position and the appropriate number of shots can be easily calculated from the set focus position. Note here that such a method involving the use of an LUT is not the only method for calculating a focus position. For example, a focus position may be calculated by defining, in a mathematical expression, a method for calculating a focus position or by making a determination with software.

Figure 1B:
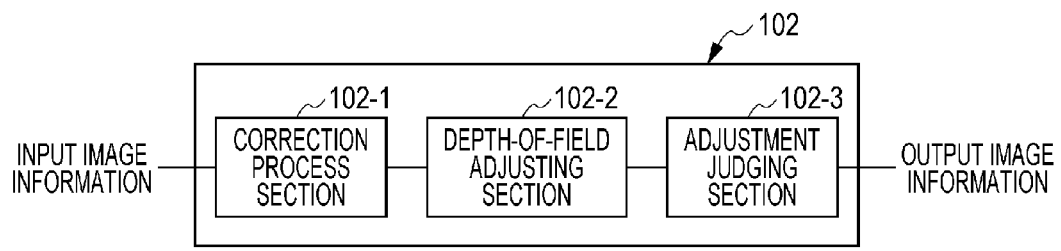
FIG. 1B is a functional block diagram showing an example configuration of an image processing section of the imaging device according to the first embodiment of the present invention.

FIG. 1B is a functional block diagram showing an example configuration of the image processing section 102.

As shown in FIG. 1B, the image processing section 102 includes a correction process section 102-1 that performs a process for making corrections for the angle of view between and the positions of plural pieces of image information of different focus positions, a depth-of-field adjusting section 102-2 that makes a depth-of-field adjustment (in the present embodiment, an adjustment directed to an extension), and an adjustment judging section 102-3 that judges whether a depth-of-field adjustment has been successfully made.

Figure 3:
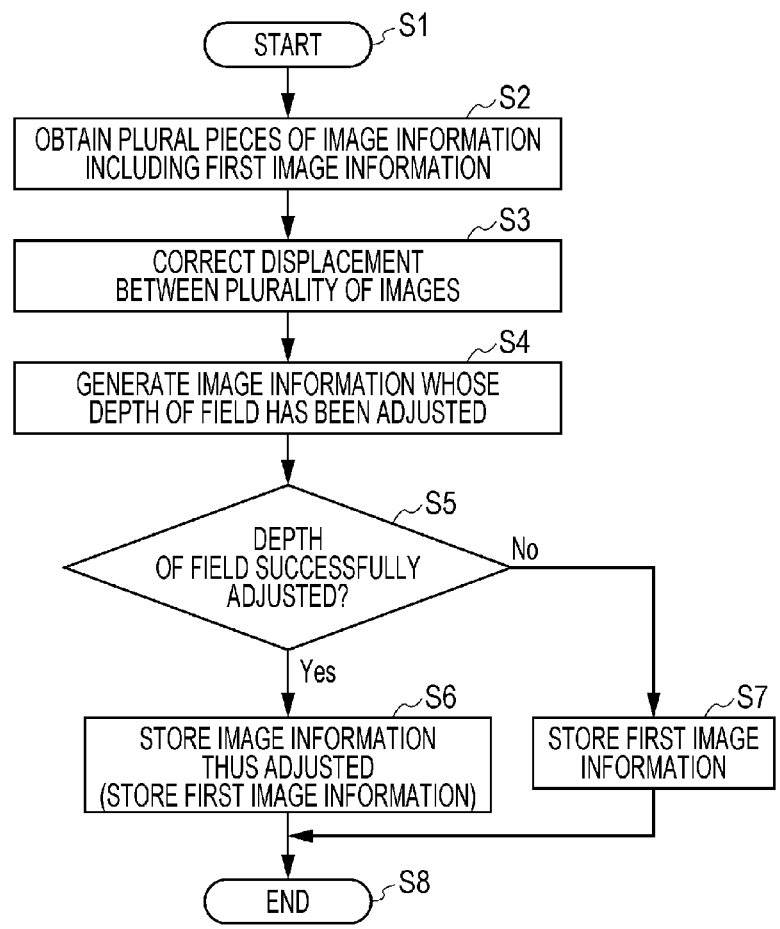
FIG. 3 is a flow chart showing an example of the flow of image processing by the imaging device according to the first embodiment of the present invention.

FIG. 3 is a flow chart showing an example of the flow of a process in the image processing section 102 according to the present embodiment. As shown in FIG. 3, the process starts (step S1: START), and in step S2, the image processing section 102 obtains first image information whose depth of field includes a subject in a set focus position and image information captured in a focus position different from the set focus position. Next, in step S3, the correction process section 102-1 performs a correction process on the plural pieces of image information thus obtained. Next, in step S4, the depth-of-field adjusting section 102-2 adjusts (extends) the depth of field. Next, in step S5, the adjustment judging section 102-3 judges whether the depth-of-field adjustment has been successfully made. In a case where the adjustment has been successfully made (Yes in step S5), the process proceeds to step S6, in which the image information thus adjusted is stored in the image memory section 105. In the case of No in step S5, the process proceeds to step S7, in which the first image information is stored in the image memory section 105. The process ends in step S8.

Figure 4:
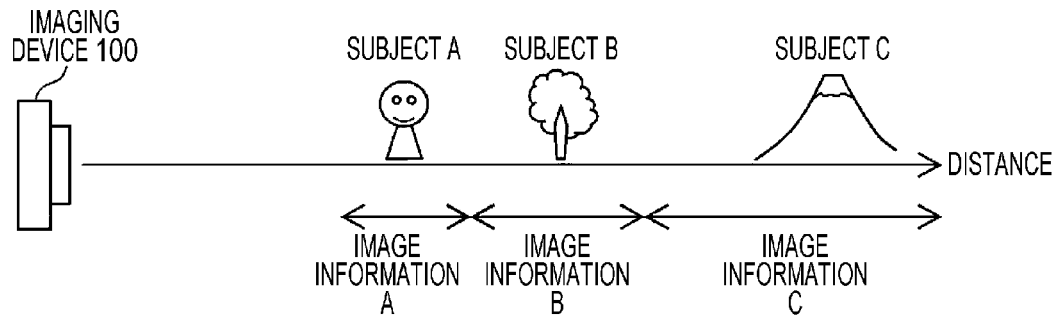
FIG. 4 is a diagram showing a positional relationship between the imaging device and subjects.

FIG. 4 is a diagram showing an example of a relationship between the distance from the imaging device 100 to each of the subjects A, B, and C and the depths of field. An arrows below each subject indicates the depth of field of a corresponding one of the pieces of image information A to C. The imaging element 101 captures the pieces of image information A to C of different focus positions. As shown in FIGS. 2A and 2B, when the subject A is designated as the focus position by face detection or user's designation, the depth of field of the image information A is set to include the subject A.

The focus position of the image information B may be set so that the depth of field of the image information B and the depth of field of the image information A are adjacent to each other as shown in FIG. 4 or partially overlap each other. This allows the shot images to have continuous depths of field and prevents image degradation, such as the appearance of an out-of-focus range in the middle of an in-focus range, in the process of extending the depth of field.

The focus position of the image information C may be set so that the depth of field of the image information C and the depth of field of the image information B are adjacent to each other as shown in FIG. 4 or partially overlap each other. This allows the shot images to have continuous depths of field and prevents image degradation, such as the appearance of an out-of-focus range in the middle of an in-focus range, in the process of extending the depth of field.

Therefore, the settings where the depths of field indicated by the arrows of the pieces of image information A, B, and C are not apart from one another as shown in FIG. 4 makes it possible to take images that give less of a feeling of strangeness, as the settings prevent, even in the presence of subjects at continuous distances from the imaging device 100, the alternate appearance of an in-focus range and an out-of-focus range, such as the appearance of an in-focus range, an out-of-focus range, and an in-focus range, in accordance with the distances from the imaging device 100.

Thus, the focus position of an image to be taken can be set according to a reference focus position.

Figure 5:
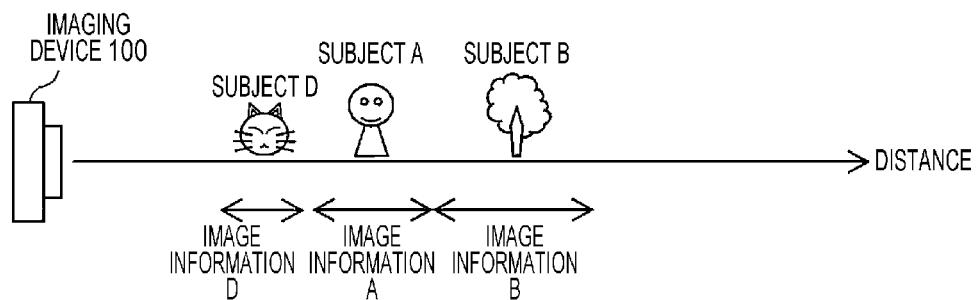
FIG. 5 is a diagram showing a positional relationship between the imaging device and subjects.

Note here that the arrangement of focus positions is not limited to an example shown in FIG. 4, in which the image information B and the image information C, which are representative of more distant views than the image information A, are captured in addition to the image information A, whose depth of field includes the subject A, i.e., the set subject. For example, as shown in FIG. 5, it is also possible to capture pieces of image information B and D representative of a nearer view and a distant view, respectively, than the image information A, whose depth of field includes the subject A, i.e., the set subject. Although not illustrated, it is similarly possible to capture only image information representative of a nearer view than the image information A. The plurality of shots such as these are preferred because they allow the user to extend the depth of field in a direction appropriate for the to-be-photographed scene by changing focus positions through user settings as a result of scene recognition as a result of contrast detection in a plurality of regions within the image information.

The plural pieces of image information of different focus positions thus captured are combined by the image processing section 102 so that an extended depth of field is obtained. The plural pieces of image information are corrected by scale-up, scale-down, translation, rotation, and the like in the correction process section 102-1 so that a subject in each piece of image information corresponds to the same subject in the other piece of image information, as there is a possibility that the change in the focus position might have led to a change in the angle of view or camera shake might have occurred.

The depth-of-field adjusting section 102-2 makes a depth-of-field adjustment on the basis of the image information thus corrected. Composite image information with an extended depth of field is generated by selecting in-focus pixels or regions from the image information thus corrected. The degree to which the pixels or regions are in focus can be achieved by comparing the contrast of each pixel or region with that of the other.

For example, in the case of any pixel in the scene shown in FIG. 4 where the contrast of the image information A is higher than the contrast of the image information B and the contrast of the image information B is higher than the contrast of the image information C, the pixel is estimated to be focused on the high-contrast image information A. Similarly, in a case where the contrast of the image information B is higher than the contrast of the image information A and the contrast of the image information B is higher than the contrast of the image information C, the pixel can be estimated to be focused on the high-contrast image information B. Similarly, in a case where the contrast of the image information C is higher than the contrast of the image information A and the contrast of the image information B is higher than the contrast of the image information A, the pixel can be estimated to be focused on the high-contrast image information B.

Further, since a low-contrast region or the like in any pixels or regions is likely to be a flat region and has no features, a composite image may be generated as an average of each pixel. Furthermore, in the case of a small difference in contrast in any pixels or regions, weighted averaging may be performed in accordance with the difference. This generates an image with a greater depth of field than that of a single image taken for example by weighted averaging from in-focus pixels or regions from a plurality of images of different focus positions.

Note here that there is a case where a movement of a subject to be photographed, camera shake of the imaging device 100, or the like makes it impossible to bring the corresponding points into correspondence with each other between a plurality of images of different focus positions. In this case, the resulting composite image with an extended depth of field ends up being a photographic failure such as a duplicate image of the subject that moved. To address this problem, the adjustment judging section 102-3 judges whether a depth-of-field adjustment has been successfully made, and on the basis of the result of judgement, image information whose depth of field includes a subject on which focus had been set before photo shooting is stored in the image memory section 105 in a case where it has been judged that the photo shooting has ended in failure.

A photographic failure can be estimated for example from a result of bringing the corresponding points on a plurality of images of different focus positions into correspondence with each other. Further, the imaging device may be mounted with a sensor capable of detecting a movement of a terminal, such as an acceleration sensor, so that a photographic failure can be estimated for example in the case of a large movement of the terminal during photo shooting. In this way, an image focused on a main subject can be taken even in the event of a failure in a depth-of-field extension process due to a movement of a subject, camera shake, or the like. This makes it possible to reduce photographic failures.

Note here that since there is a case where, depending on the image quality of a depth-of-field extension process, the user feels that he/she has failed, image information (first image information) whose depth of field includes a subject on which focus had been set before photo shooting may be stored together with image information with an extended depth of field. Storing all pieces of image information captured for a depth-of-field extension uses much of the memory of the storage medium per occurrence of photo shooting. Therefore, image information whose depth of field includes a subject on which focus had been set before photo shooting is stored, as such image information is expected to be the one that the user would most like to capture, and the amount of memory used is reduced by erasing other pieces of image information. This makes it possible to reduce photographic failures such as missing the timing of photo shooting. Therefore, in a case where such a process is performed, the image information whose depth of field has been adjusted and the first image information are stored in step S6 shown in FIG. 3.

Furthermore, in the case of such an imaging device capable of storing two pieces of image information, i.e., the image information whose depth of field has been adjusted and the first image information, it is preferable that the user be allowed to set whether to store image information whose depth of field includes a subject on which focus had been set before photo shooting. Note here that the to-be-stored image information focused on the main subject may be the original image information captured or image information obtained by making corrections for the corresponding points between a plurality of images.

As described above, the first embodiment of the present invention makes it possible to provide an imaging device which, even in the case of making a composite image with an extended depth of field, sets a focus position according to a main subject or the like before photo shooting and thereby enables a depth-of-field extension appropriate for the subject thus set and which, even in the event of a failure in a depth-of-field extension process due to a movement of a subject, camera shake, or the like, can take an image focused on the main subject.

Further, the process for extending a depth of field according to the present embodiment may further include image processing according to the distance to a subject, although plural pieces of image information of different focus positions can be combined for example by performing weighted averaging so that great weights are assigned to pixels of high sharpness. Comparing the sharpness of plural pieces of image information captured makes it possible to calculate simplified depth information. Performing image processing in accordance with the depth information makes it possible to generate an image that gives more of a feeling of depth.

For example, a contour enhancement process is performed more intensely on a pixel estimated to be a pixel in a distant view than on a pixel estimated to be a pixel in a near view. That is, the counter enhancement process is performed on a subject located in a distant view where application of intense image processing hardly gives a feeling of strangeness, because performing intense counter enhancement on a subject in a near view ends up with an image that gives a feeling of strangeness. This makes it possible to improve a feeling of depth by making clear a subject that would otherwise become lower in contrast because it is located in a distant view. Since depth information that is calculated from plural pieces of image information is calculated by utilizing sharpness in a region where there are features such as patterns or contours, the counter enhancement process, which easily has an effect on an edge region of image information, is suitable as image processing utilizing depth information.

Second Embodiment

Next, a second embodiment is described.

Since an example configuration of an imaging device 100 according to the present embodiment is the same as that of the first embodiment, a detailed description of each of the common components is omitted.

Figure 6:
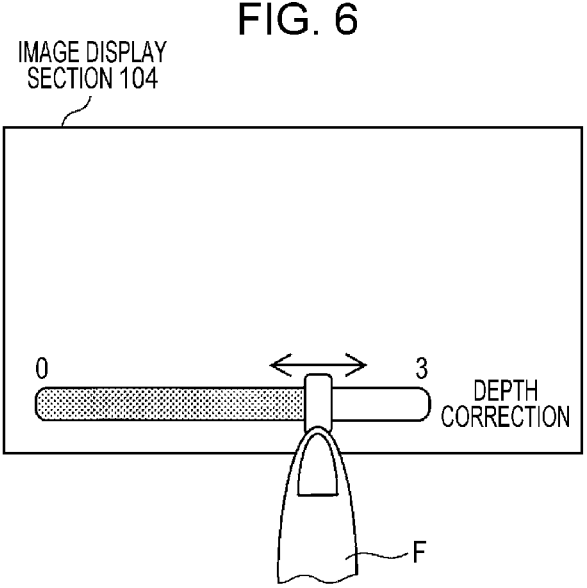
FIG. 6 is a diagram showing an example display of a user interface for making a depth correction level adjustment in an imaging device according to a second embodiment of the present invention.

The imaging device 100 according to the present embodiment allows the user to set a range over which a depth-of-field extension is made. For example, the imaging device 100 according to the present embodiment includes the range-of-adjustment setting section 106 shown in FIG. 1A. For example, the image display section 104 displays such a screen as that shown in FIG. 6, and the range-of-adjustment setting section 106 allows the user to set the depth of field. FIG. 6 shows a case where the image display section 104 is constituted by a touch panel and the user makes a depth correction level adjustment with the finger F. The present embodiment sets discrete depth correction levels of 0 to 3. At the depth correction level of 0, no depth-of-field extension is made. At the depth correction level of 3, the greatest depth-of-field extension is made.

Figure 7:
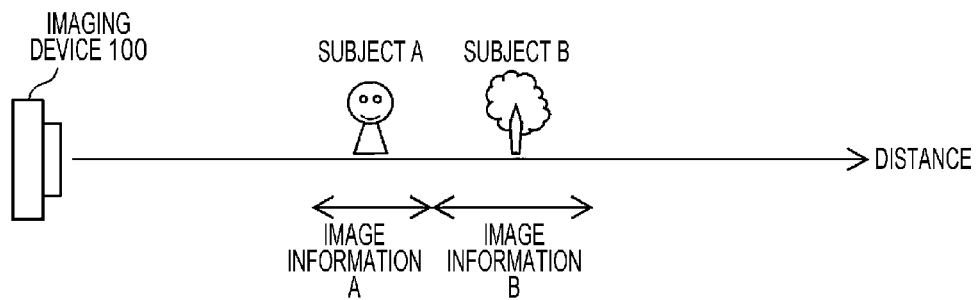
FIG. 7 is a diagram showing a positional relationship between the imaging device and subjects.
Figure 8:
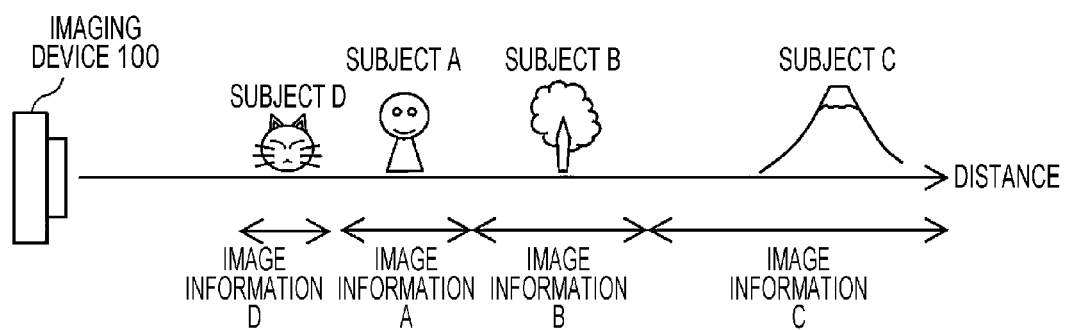
FIG. 8 is a diagram showing a positional relationship between the imaging device and subjects.

As a method for taking an image with an extended depth of field according to the present embodiment, the method described in section "First Embodiment" can be used. Therefore, in a case where the depth correction level is 0, an image taken in a focus position set before photo shooting is stored in the image memory section 105. In a case where the depth correction level has been adjusted to change from 1 to 3, a composite image with an extended depth of field is generated from image information of different focus positions. The range of depth-of-field extension is for example set as shown in FIG. 7 when the depth correction level is 1, as shown in FIG. 4 or 5 when the depth correction level is 2, and as shown in FIG. 8 when the depth correction level is 3.

At this point in time, at least image information whose depth of field includes a subject on which focus had been set before photo shooting is captured, and image information of different focus positions is captured for a depth-of-field extension. Further, since there is a difference in set value of the range of depth-of-field extension between FIG. 7 and FIG. 8, there is a difference in the number of pieces of image information that are needed for the depth-of-field extension process. Accordingly, the number of shots is varied according to the set value of the set range of depth-of-field extension. A reduction in the number of shots leads to a shortening of the time from the start of photo shooting to the end of photo shooting in taking images with shifts in focus position. This makes it possible to reduce movements of subjects and camera shake. That is, photographic failures can be reduced by focusing on a main subject and setting the number of shots according to the range of depth-of-field extension that the user desires.

The above-described setting of a focus position can be achieved in a manner similar to that in which it is achieved in the first embodiment. For example, an LUT is prepared for each depth correction level, and a focus position to be photographed is calculated on the basis of a set focus position. In a case where the depth correction level is 1, two focus positions A and B to be photographed are calculated with respect to the set focus position A. In a case where the depth correction level is 3, four focus positions D, A, B, and C are calculated with respect to the set focus position A.

As described above, when image information to be captured for a depth-of-field extension is taken with a focus position appropriately set according to the focus position set before photo shooting and the set range of depth-of-field extension, focusing is set on a main subject, and failures in the depth-of-field extension process due to a movement of a subject or camera shake can be reduced by shortening the time of photo shooting.

Note that even in the case of a failure in a depth-of-field extension process due to the occurrence of a movement of a subject or camera shake for a reason such as a large number of shots, application of the method described in section "First Embodiment" makes it possible to store an image focused on a main subject, thus making it possible to reduce photographic failures.

Note here that the capture of plural pieces of image information of different focus positions does not need to start with image information whose depth of field includes a subject in a focus position set before photo shooting. That is, in a case where, in such a scene as that shown in FIG. 5, the subject A is in the focus position set before photo shooting, the order of photo shooting may be such that the image information B, the image information A, and the image information D are captured in this order or such that the image information D, the image information A, and the image information B are captured in this order. In view of lens driving or the like for a focus position adjustment, an unidirectional operation is preferred because it is a simpler operation.

Further, although the present embodiment makes no depth-of-field extension in a case where the depth correction level is 0, it is possible to separately configure settings where a depth-of-field extension process can be enabled or disabled and, in a case where it is enabled, perform the depth-of-field extension process at all levels.

Third Embodiment

Figure 9:
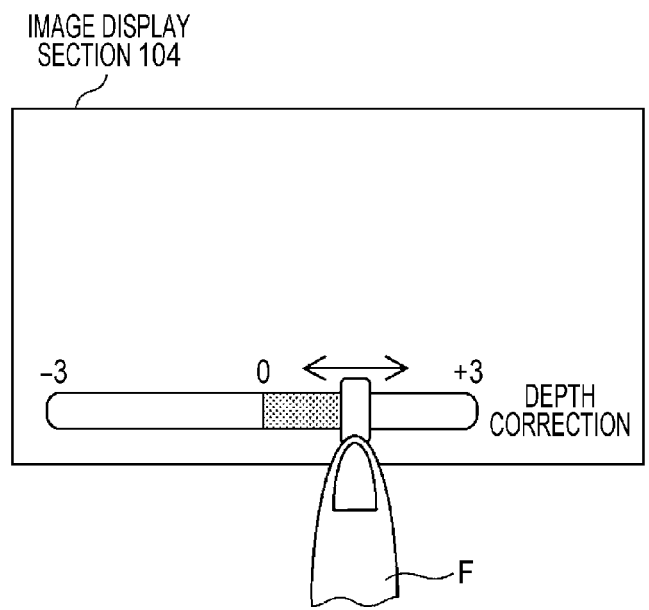
FIG. 9 is a diagram showing an example display of a user interface for making a depth correction level adjustment in an imaging device according to an embodiment of the present invention.

The first and second embodiments described above have dealt with only cases where the depth of field is extended. However, as in the case of a third embodiment of the present invention, it is possible to incorporate image processing directed to a depth-of-field reduction. As shown in FIG. 9, a scale of depth correction level adjustment is set so that a depth-of-field extension is made on a positive side with respect to a reference and a depth-of-field reduction is made on a negative side with respect to the reference. In the case of a depth correction level set at the reference or on the positive side with respect to the reference, a process similar to the method described above is performed.

In the case of a depth correction level set on the negative side with respect to the reference, the depth of field is reduced. In this case, too, as in the case of an extension, focusing is set on a main subject before photo shooting, and during the photo shooting, image information whose depth of field includes a focus position of the main subject is obtained. Then, image information that reduces the depth of field is obtained by photo shooting in a different focus position.

In the case of a depth-of-field reduction, too, corrections are made so that a subject in each of a plurality of images corresponds to the subject in the other of the plurality of images, and a comparison of contrast is made. A depth-of-field reduction serves as a blurring process, and can be achieved for example by performing averaging. An image focused on the main subject is used as a reference. Simplified depth information is obtained by making a comparison of sharpness between the plurality of images. Pixels representative of a subject more distant from the main subject is blurred to a greater extent. Alternatively, a depth-of-field reduction can also be achieved by performing photo shooting in focus positions in front and behind the main subject and, except in a region where the main subject is in focus, performing weighted averaging or the like so that weights are assigned to pixels or regions of lower sharpness.

The number of pieces of image information to be captured in focus positions different from that of the first image information is determined by the control section 103 on the basis of the range over which the image processing section 102 makes a depth-of-field adjustment, i.e., the set depth correction level, so that the depth of field of the first information is adjusted. It should be noted that as a method for calculating a focus position to be photographed, the method described in sections "First Embodiment" and "Second Embodiment" can be used.

The number of pieces of image information to be captured may become larger as the absolute value of the depth correction level becomes larger. This makes it possible to appropriately shorten the time from the start of photo shooting to the end of photo shooting according to a desired range of adjustment, thus making it possible to reduce failures in a depth-of-field extension or reduction process due to a movement of a subject, camera shake, or the like. Further, by storing image information whose depth of field includes a subject on which focus had been set before photo shooting, an image focused on the main subject can be stored even in the event of a failure in a depth-of-field extension or reduction process. This makes it possible to reduce photographic failures.

Thus, also in the case of incorporation of image processing directed to a depth-of-field reduction, photographic failures can be reduced by photo shooting utilizing a focus position set before the photo shooting.

As described above, an imaging device according to an embodiment of the present invention makes it possible to, even in the case of making a composite image with an extended depth of field, set a focus position and thereby make a depth-of-field extension appropriate for the subject thus set, and also makes it possible to, even in the event of a failure in a depth-of-field extension process due to a movement of a subject, camera shake, or the like, take an image focused on the main subject.

Further, components and the like of the embodiments described above are not limited to those illustrated in the accompanying drawings, but rather may be appropriately varied to the extent that the effects of the present invention are exerted. In addition, appropriate variations may be carried out, provided such variations do not deviate from the intended scope of the present invention.

Further, each component of the present invention can be optionally chosen, and an invention including a chosen element is also encompassed in the present invention.

Further, a process in each section may be performed by storing, in a computer-readable recording medium, a program for achieving the functions described in the embodiments and by causing a computer system to read in and execute the program stored in the recording medium. The term "computer system" as used herein encompasses hardware such as an OS and a peripheral device.

Further, in a case where a WWW system is utilized, the term "computer system" also encompasses a homepage providing environment (or display environment).

Further, the term "computer-readable recording medium" means a portable medium such as a flexible disk, a magneto-optical disk, ROM, or CD-ROM and a storage device built in the computer system, such as a hard disk. Furthermore, the term "computer-readable recording medium" also encompasses one that dynamically retains the program for a short period of time, such as a communication wire in the case of transmission of the program via a network such as the Internet or a communication line such as a telephone line, and one that retains the program for a certain period of time, such as a volatile memory inside the computer system that serves as a server or a client in that case. Further, the program may be one that achieves one or some of the aforementioned functions, or may be one that can achieve the aforementioned functions in combination with a program already stored in the computer system. At least one or some of the functions may be achieved by hardware such as an integrated circuit.

(Supplementary Note)

The present invention encompasses the following disclosures:

(1) An imaging device including:

an imaging element that obtains image information with varied focus positions;

a control section that controls the focus positions; and an image processing section that performs image processing on the image information, wherein the image processing section includes a depth-of-field adjusting section that performs a process for generating, from plural pieces of image information obtained by the imaging element, an image whose depth of field has been adjusted, the plural pieces of image information include first image information whose depth of field includes a subject in a focus position set by the control section when the plural pieces of image information were obtained and second image information captured in a focus position different from that of the first image information, the focus position of the second image information is set on a basis of the focus position of the first image information, and the first image information is stored together with the image whose depth of field has been adjusted.

An image focused on a main subject can be taken even in the event of a failure in a depth-of-field extension process due to a movement of a subject, camera shake, or the like.

(2) The imaging device according to (1), wherein the image processing section further includes an adjustment judging section that judges a result of an adjustment made by the depth-of-field adjusting section, and the first image information is stored on a basis of a result of a judgment made by the adjustment judging section.

(3) The imaging device according to (1) or (2), wherein the focus position of the second image information is set so that the depth of field of the first image information and the depth of field of the second image information are adjacent to each other or partially overlap each other.

This makes it possible to take images that give less of a feeling of strangeness, as this prevents, even in the presence of subjects at continuous distances from the imaging device, the alternate appearance of an in-focus range and an out-of-focus range, such as the appearance of an in-focus range, an out-of-focus range, and an in-focus range, in accordance with the distances from the imaging device.

(4) The imaging device according to any one of (1) to (3), wherein the number of plural pieces of image information to be obtained in focus positions different from that of the first image information is set on the basis of the focus position of the first image information.

(5) The imaging device according to any one of (1) to (3), wherein the image processing section determines, on a basis of the focus position of the first image information and a range of depth-of-field adjustment, the number of plural pieces of image information to be obtained in focus positions different from that of the first image information, and adjusts the depth of field of the first image information.

(6) The imaging device according to (5), wherein the number of pieces of image information becomes larger as an absolute value of a depth correction level becomes larger.

This makes it possible to appropriately shorten the time from the start of photo shooting to the end of photo shooting according to a desired range of adjustment, thus making it possible to reduce failures in a depth-of-field extension or reduction process due to a movement of a subject, camera shake, or the like.

(7) The imaging device according to any one of (1) to (6), wherein the adjustments are a combination of an adjustment directed to a depth-of-field extension and an adjustment directed to a depth-of-field reduction.

(8) The imaging device according to any one of (1) to (7), wherein the focus position of the first image information is set by autofocus.

(9) An imaging device including: an imaging element that obtains image information with varied focus positions; a control section that controls the focus positions; and an image processing section that performs image processing on the image information, the image processing section including a depth-of-field adjusting section that performs a process for generating, from plural pieces of image information obtained by the imaging element, an image whose depth of field has been adjusted and an adjustment judging section that judges a result of an adjustment made by the depth-of-field adjusting section, wherein the plural pieces of image information include first image information whose depth of field includes a subject in a focus position set by the control section when the plural pieces of image information were obtained and second image information captured in a focus position different from that of the first image information, the focus position of the second image information is set on a basis of the focus position of the first image information, and the first image information is stored when a process for adjusting the depth of field has failed.

(10) A method for processing in an imaging device including: an imaging element that obtains image information with varied focus positions; a control section that controls the focus positions; an image processing section that performs image processing on the image information; and an adjustment judging section that judges a result of an adjustment made by a depth-of-field adjusting section, the method including a depth-of-field adjusting step of performing a process for generating, from plural pieces of image information obtained by the imaging element, an image whose depth of field has been adjusted, wherein the plural pieces of image information include first image information whose depth of field includes a subject in a focus position set by the control section when the plural pieces of image information were obtained and second image information captured in a focus position different from that of the first image information, the focus position of the second image information is set on a basis of the focus position of the first image information, and the first image information is stored together with the image whose depth of field has been adjusted.

(11) A program for causing a computer to execute the method according to (10).

INDUSTRIAL APPLICABILITY

The present invention is applicable to an imaging device. Further, the present invention is also applicable to a device that performs image processing, such as a television.

REFERENCE SIGNS LIST

100 Imaging device
101 Imaging element
102 Image processing section
103 Control section
104 Image display section
105 Image memory section
106 Range-of-adjustment setting section All publications, patents, and patent applications cited herein are directly incorporated herein by reference.

The invention claimed is:

1. An imaging device comprising:
    an imaging element that obtains image information with varied focus positions; and
    circuitry; wherein
    the circuitry controls the focus positions;
    the circuitry performs image processing on the image information;
    the circuitry performs a process of generating, from plural pieces of image information obtained by the imaging element, an image whose depth of field has been adjusted,
    the plural pieces of image information include first image information whose depth of field includes a subject in a focus position set by the circuitry when the plural pieces of image information were obtained and second image information captured in a focus position different from that of the first image information, and
    the circuitry automatically stores the image whose depth of field has been adjusted and the first image information in a storage, and does not store the second image information.

2. The imaging device according to claim 1, wherein the circuitry judges a result of an adjustment of the depth of field of the image, and
    the first image information is stored in the storage on a basis of a result of a judgment made by the circuitry.

3. The imaging device according to claim 1, wherein the focus position of the second image information is set so that the depth of field of the first image information and the depth of field of the second image information are adjacent to each other or partially overlap each other.

4. The imaging device according to claim 1, wherein the number of plural pieces of image information to be obtained in focus positions different from that of the first image information is set on the basis of the focus position of the first image information.

5. The imaging device according to claim 1, wherein the number of plural pieces of image information to be obtained in focus positions different from that of the first image information is determined on a basis of the focus position of the first image information and a range of depth-of-field adjustments, and the circuitry adjusts the depth of field of the first image information.

6. The imaging device according to claim 1, wherein the circuitry determines a range of adjustments of the depth of field of the first image information, wherein, depending on a setting made by the circuitry, the circuitry performs a process of extending the depth of field of the first image information or a process of reducing the depth of field of the first image information.

7. The imaging device according to claim 1, wherein the image whose depth of field has been adjusted and the first image information, which are stored in the storage, are each configured to be displayed by a display.

8. An imaging device comprising:
an imaging element that obtains image information with varied focus positions; and
circuitry; wherein
the circuitry controls the focus positions,
the circuitry performs image processing on the image information,
the circuitry performs a process of generating, from plural pieces of image information obtained by the imaging element, an image whose depth of field has been adjusted,
the plural pieces of image information include first image information whose depth of field includes a subject in a focus position set by the circuitry when the plural pieces of image information were obtained and second image information captured in a focus position different from that of the first image information,
the circuitry judges a result of an adjustment the depth of field of the image made by the circuitry,
the first image information is stored in a storage on a basis of a result of a judgment made by the circuitry, and
the second image information is not stored in the storage.

9. An imaging device comprising:
an imaging element that obtains image information with varied focus positions; and
circuitry; wherein
the circuitry controls the focus positions,
the circuitry performs image processing on the image information,
the circuitry performs a process of generating, from plural pieces of image information obtained by the imaging element, an image whose depth of field has been adjusted,
the plural pieces of image information include first image information whose depth of field includes a subject in a focus position set by the circuitry when the plural pieces of image information were obtained and second image information captured in a focus position different from that of the first image information, and
the first image information is stored in a storage on a basis of a movement of the imaging device, and
the second image information is not stored in the storage.

* * * * *